United States Patent [19]

Woodall, Jr. et al.

[11] Patent Number: 4,811,311

[45] Date of Patent: Mar. 7, 1989

[54] SEISMIC DETECTOR ASSEMBLY HAVING POLARIZED TERMINALS

[75] Inventors: James C. Woodall, Jr.; S. E. Haggard, both of Houston, Tex.

[73] Assignee: Mark Products Incorporated, Houston, Tex.

[21] Appl. No.: 107,163

[22] Filed: Oct. 13, 1987

[51] Int. Cl.$^4$ .............................................. H04R 1/02
[52] U.S. Cl. .................................. 367/178; 367/188; 73/649; 439/624; 181/122
[58] Field of Search ................. 73/649, 651, 652, 654; 367/178, 180, 188; 181/122; 439/624, 623, 53

[56] References Cited

U.S. PATENT DOCUMENTS

| | | | |
|---|---|---|---|
| 3,911,388 | 10/1975 | Crump et al. | 310/8.4 |
| 4,594,698 | 6/1986 | Hefer | 367/188 |
| 4,637,001 | 1/1987 | Annoot | 367/177 |
| 4,720,267 | 1/1988 | De Jong | 439/624 |

Primary Examiner—Deborah L. Kyle
Assistant Examiner—John W. Eldred
Attorney, Agent, or Firm—Vanden, Eickenroht, Thompson & Boulware

[57] ABSTRACT

A seismic detector assembly is disclosed that includes a housing and a seismic detector or geophone located in the housing. The geophone has a pair of external terminals that are positioned asymmetrical to the longitudinal axis of the geophone. A printed circuit board having conductive strips for connecting the terminals to leader cables is located in the housing above the geophone. The printed circuit board has a pair of asymmetrical openings through which the asymmetrical terminals can extend only when the printed circuit board is oriented in one position relative to the geophone. Marks on the printed circuit board indicate which conductive strip should be connected to which terminal and the proper orientation of the printed circuit board relative to the truck that receives the output of the geophone.

20 Claims, 2 Drawing Sheets

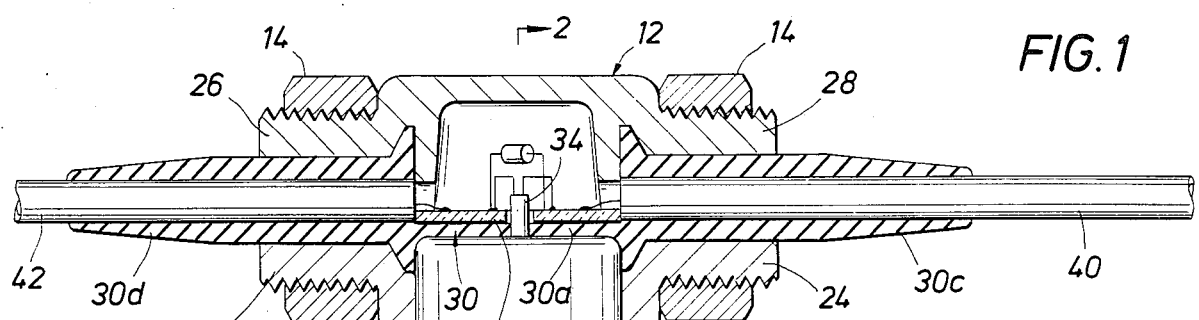
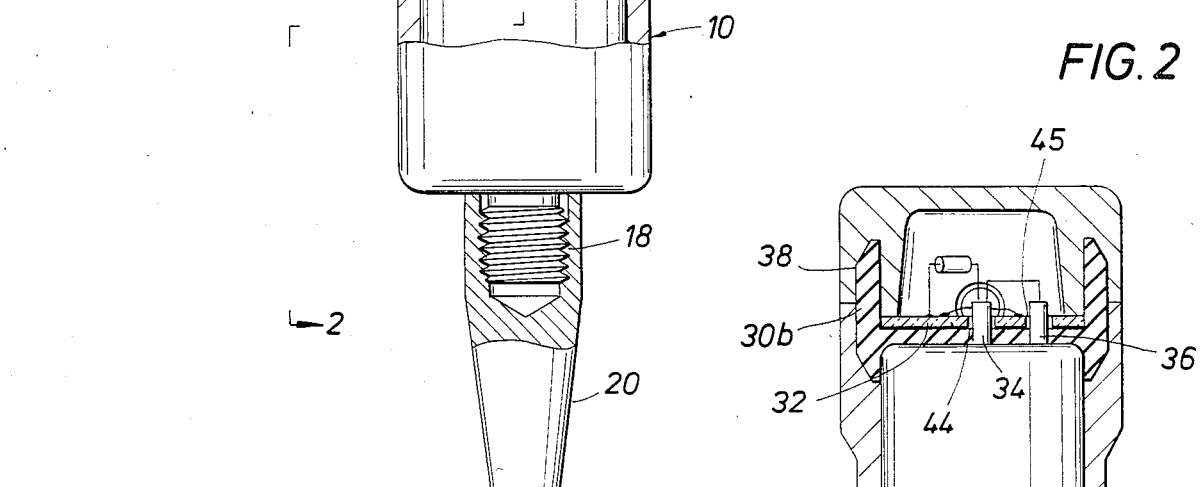
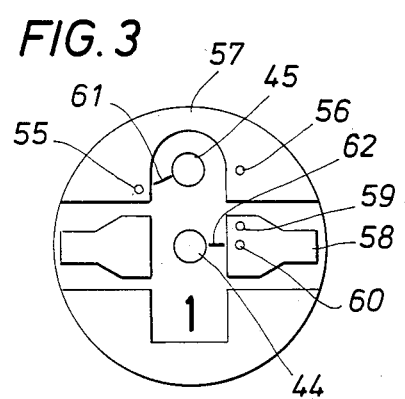
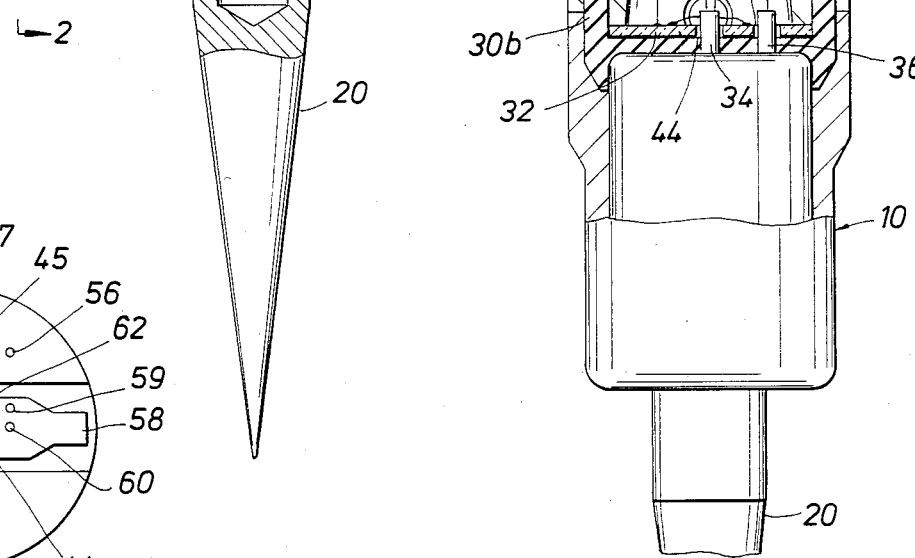
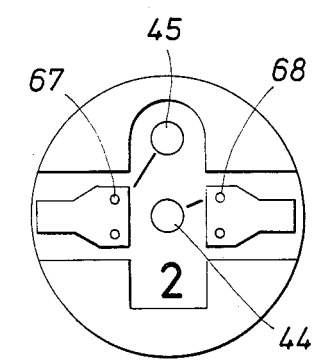
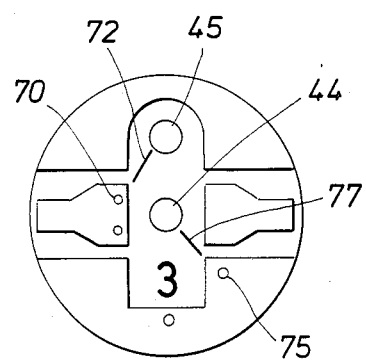
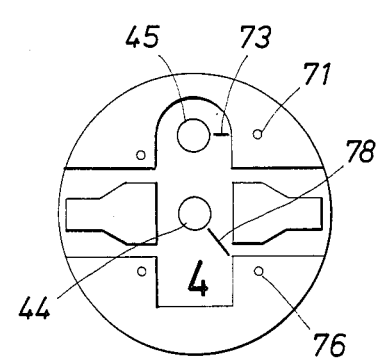
FIG. 1    FIG. 2    FIG. 3    FIG. 4    FIG. 5    FIG. 6

SEISMIC DETECTOR ASSEMBLY HAVING POLARIZED TERMINALS

This invention relates to a seismic detector having polarized terminals and in particular to the assembly of such a seismic detector in its housing so as to insure the location of the terminals in a preselected position relative to the conductor wires of the leader cable that are electrically connected to the terminals.

This invention is useful with all seismic detectors. The most commonly used seismic detector is the geophone and this invention will hereafter be described in connection with a geophone.

A geophone has two external terminals for connecting the geophone into the circuit that will carry its output signal to the recording truck. One is a positive terminal and one is a negative terminal. In a geophone string, a large number of geophones are connected electrically to the conductors of a leader cable. The terminals are marked on the case as being positive and negative, but since they are symmetrical with respect to the longitudinal axis of the case, errors do occur and the terminals are connected into the circuit backward. After the string of geophones has been assembled, they are tested and if one has its terminals reversed, it is easily detected. The problem is in locating which of the geophones has its terminals reversed. This can take a lot of time. Also, in the field, when repairs are made to geophone strings, it is often necessary to replace several geophones. This means that the terminals have to again be electrically connected into the conductor wires of the leader cable and the same mistake can occur with the same time consuming effort required to track down the one that is connected with its terminals reversed.

It is an object of this invention to provide a geophone having terminals that are asymmetrical with respect to the longitudinal axis of the geophone that combine with orienting means that are part of the housing to insure that there can be no doubt to the person assembling the geophone in the housing which is the positive terminal and which is the negative terminal.

It is a further object of this invention to provide a geophone housing having orienting means located in the housing that will insure that the geophone terminals are properly oriented with respect to the conductor wires of the leader cable that lead to the truck and the conductor wires of the leader cable that lead to the geophones away from the truck.

It is a further object of this invention to provide a geophone housing with a printed circuit (PC) board having openings that will receive the terminals of a geophone only when the geophone is oriented in the proper position with respect to the PC board.

It is a further object of this invention to provide a seismic detector assembly including a seismic detector having a pair of external terminals to be electrically connected to the conductor wires of a leader cable through which the output signal of the detector is transmitted and orienting means associated with the detector having openings through which the external terminals can extend so the openings and terminals are positioned to allow the detector to be oriented in only one preselected position relative to the orienting means when the terminals extend through the openings.

It is a further object of this invention to provide such a seismic detector assembly in which the seismic detector is symmetrical relative to a central axis and the terminals are asymmetrical to the central axis.

It is a further object of this invention to provide such an assembly in which the terminals and openings are shaped so only one opening will receive a preselected terminal.

It is a further object of this invention to provide such a seismic detector assembly in which the orienting means is a printed circuit board having conductive strips to which the terminals are electrically connected.

It is a further object of this invention to provide such a seismic detector assembly in which the conductor wires of the leader cable are connected electrically to a plurality of seismic detectors and in which the printed circuit board includes means for indicating the proper orientation of the printed circuit board relative to the other seismic detectors.

It is a further object of this invention to provide such a seismic detector assembly in which the orientation indicating means includes a mark that indicates the proper position of the printed circuit board relative to the other seismic detectors connected to the leader cable.

It is a further object of this invention to provide such a seismic detector assembly in which the mark is alphameric.

It is a further object of this invention to provide such a seismic detector assembly in which the terminals are connected to the conductive strips by pigtails and in which the conductive strip to which each terminal is to be connected is provided with a hole to facilitate soldering the pigtail to the conductive strip and means are provided for indicating which conductive strip is to be connected to which terminal.

It is a further object of this invention to provide a seismic detector assembly comprising a seismic detector having a pair of external terminals that are positioned asymmetrical to the longitudinal axis of the detector and a printed circuit board having conductive strips for connecting the terminals to leader cables, said printed circuit board having a pair of asymmetrical openings through which the terminals can extend only when the printed circuit board is in one position relative to the seismic detector to locate the desired conductive strip adjacent each terminal.

It is a further object of this invention to provide a seismic detector for mounting in a housing having leader cables extending into the housing with conductor wires for connecting electrically to the seismic detector, the detector having an outer case that encloses the detector and a positive terminal and a negative terminal that extends outwardly from the case with the terminals positioned asymmetrically to the longitudinal axis of the case so the identity of each terminal can be determined by their positions relative to each other and to the case.

These and other objects, advantages, and features of this invention will be apparent to those skilled in the art from a consideration of this specification including the attached drawings and appended claims.

In The Drawings:

FIG. 1 is a sectional view through a preferred embodiment of the seismic detector assembly of this invention.

FIG. 2 is a sectional view taken along line 2—2 of FIG. 1.

FIGS. 3, 4, 5, and 6 are views of four PC boards that are used in the housing assembly of this invention for connecting the seismic detectors or geophones in series, parallel, or series-parallel as the case may be.

Figure 7:
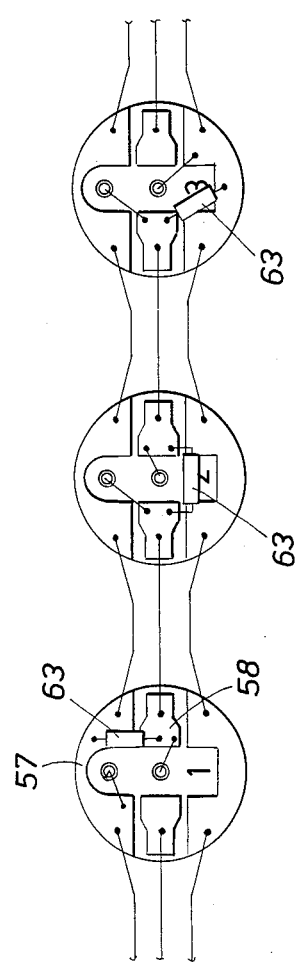
Figure 8:
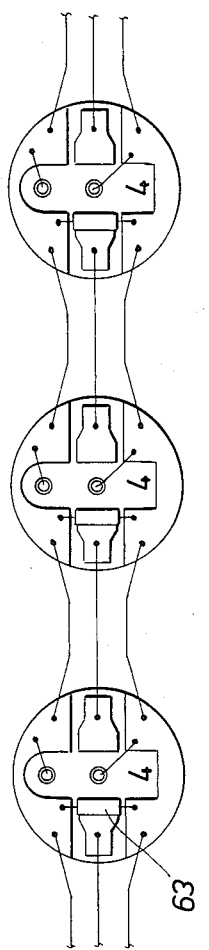
Figure 9:
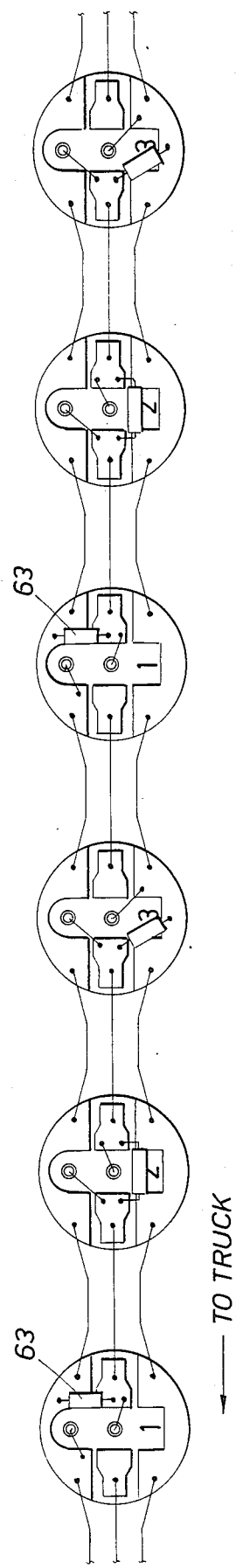

FIGS. 7, 8, and 9 show the arrangement of the PC boards to connect several geophones in series, parallel, and series-parallel.

In the embodiment shown, the geophone housing assembly includes housing 10, cap 12, and retaining nuts 14. Housing 10 has cylindrical cavity 10a, which is closed at the lower end and open at its upper end. The cavity is cylindrical in cross-section and is designed to provide a snug fit with geophone 16 so that there is no lateral relative movement between the geophone and the housing. The housing includes threaded stud 18 that is used to connect spike 20 to the lower end of the housing. By pushing the spike into the ground, a good connection is provided between the ground, the geophone housing, and the geophone.

The housing includes semi-circular threaded members 22 and 24 located on opposite sides of the housing that combine with threaded semi-circular members 26 and 28 on the cap to form circular threaded members on opposite sides of the cap and housing. The members have threads that mate with the threads on nuts 14. When the nuts are made up on the threaded members, as shown in FIG. 1, they will complete the assembly of the geophone housing. At the same time, the cap will compress circular disc portion 30a of seal member 30 between the upper surface of geophone 16 and PC board 32, thereby forcing circular disc portion 30a into sealing engagement with terminals 34 and 36 of the geophone and with the upper end of the geophone case.

Seal member 30 also includes annular section 30b shown in FIG. 2. The upper portion of this section is located in annular groove 38 in cap 12 and the lower portion extends downwardly into the open end of the housing to surround the upper end of geophone 16. Extending outwardly from opposite sides of annular portion 30b of the seal member are tubular portions 30c and 30d in which are located sections 40 and 42 of a leader cable. The various portions of seal member 30 are designed so that when the nuts are made up on threaded sections 22–28, the elastomeric material of the seal member will be compressed between the cap and the housing and forced into sealing engagement with the clamping surfaces such that water will be prevented from entering the internal cavities of the housing and the cap.

PC board 32 is provided with openings 44 and 45 through which terminals 34 and 36 extend. Ample clearance is provided between the terminals and the PC board by these openings so that the PC board can move downwardly toward the geophone and compress section 30a of the seal member without imposing any compressive load on the terminals. Some lateral movement of the PC board relative to the terminals is also allowed without imposing any stresses on the terminals.

As best seen in FIGS. 2 and 3, terminals 34 and 36 are not positioned symmetrically with respect to the longitudinal axis of the geophone. In fact, in this embodiment, terminal 34 is located along the longitudinal axis of the geophone whereas terminal 36 is offset therefrom. The openings in the PC board are arranged in the same manner to receive the terminals when the geophone is assembled in the housing.

Assuming that the central terminal is the positive terminal and the offset terminal is the negative terminal, then it is important that these terminals be positioned in the proper manner with respect to the conductor wires to which they are to be connected through the conductive strips on the PC board so that all the geophones in the string will be connected into the circuit in the same manner. To accomplish this, means are provided to indicate how the PC board should be positioned relative to the conductor wires of the leader cable that lead to the truck. This, in turn, positions all terminals in the same position relative to the conductor wires.

In FIGS. 3, 4, 5, and 6, four PC board configurations are shown for connecting the geophones in series, parallel, and series-parallel. Each PC board is provided with a mark that will indicate to the person connecting the terminals to the PC board the proper position of the board relative to the conductor of the leader cable. In the embodiment shown, each PC board is identified by an alphameric mark, in this case the Nos. 1–4. The technicians who connect the geophone assemblies to the conductors of the leader cable will be instructed that when the mark is right side up and the end of the cable closest to the recording truck is on his left, the terminals and the PC board are properly positioned.

Once properly positioned, connecting the terminals, the conductive strips of the PC board, and the conductors of the leader cable correctly is relatively simple. For example, to connect the string of geophones in series, as shown in FIG. 7, three PC boards are employed. They are PC boards numbered 1, 2, and 3 shown in FIGS. 3, 4, and 5. The conductors of the leader cable are Nos. 1, 2, and 3, with 1 being the negative conductor and 3 the positive conductor. Referring to FIG. 3 and FIG. 7, holes 55 and 56 are located in conductive strip 57 of the PC board No. 1, on opposite sides of opening 45 through which negative terminal 45 of the geophone extends. Conductive strip 58 has holes 59 and 60 adjacent opening 44 through which positive terminal 34 extends. As shown in FIG. 7, negative terminal 45 is connected to conductive strip 57 by pigtail wire 62, one end of which is soldered to the terminal. The other end is connected to conductive strip 57 by locating the end in opening 55 and filling the opening around with solder. The openings are provided to facilitate the soldering of the pigtails to the conductive strips and provide a physically strong and good electrical connection between the two.

In each case, two different conductive strips will be connected to the terminals and a damping resistor will be connected between the two conductive strips. Four holes are provided, two in each conductive strips. For example, in PC board No. 1, holes 55 and 56 are located in conductive strip 57 and holes 59 and 60 are located in conductive strip 58. So the technician will know which terminal is to be connected to which strips, means are provided to indicate which terminal is to be connected to which hole. In the embodiment shown, markers such as lines 61 and 62 are positioned so they point toward the opening through which a terminal extends and the hole to which it should be connected by a pigtail. The remaining two holes connect damping resistor 63 to the conductive strips 57 and 58 as shown in FIGS. 7 and 9.

In FIG. 4, lines 65 and 66 on PC board No. 2 indicate that the terminal located in opening 45 should be connected to hole 67 and the terminal located in opening 44 should be connected to hole 68. In FIGS. 5 and 6, the terminals in opening 45 of PC boards 3 and 4 should be connected to openings 70 and 71 as indicated by lines 72 and 73 and the terminals in openings 44 should be connected to holes 75 and 76 as indicated by lines 77 and 78. In each case, the remaining holes are used to connect a damping resistor, indicated generally in FIGS. 7, 8, and 9 by the number 63, to the two conductive strips connected to the terminals.

From the foregoing it will be seen that this invention is one well adapted to attain all of the ends and objects hereinabove set forth, together with other advantages that are obvious and that are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a seismic detector assembly including a housing, leader cables with conductor wires extending into the housing, a seismic detector located in the housing, said detector having a pair of external terminals to be electrically connected to the conductor wires of the leader cable through which the output signal of the detector is transmitted, the improvement comprising orienting means positioned in the housing and having openings through which the external terminals of the detector can extend, said openings and terminals being positioned to allow the detector to be oriented in only one preselected position relative to the orienting means when the terminals extend through the openings.

2. The seismic detector assembly of claim 1 in which the seismic detector is symmetrical relative to a central axis and the terminals are asymmetrical to the central axis.

3. The seismic detector assembly of claim 1 in which the terminals and openings are shaped so only one opening will receive a preselected terminal.

4. The seismic detector assembly of claim 1 in which the orienting means is a printed circuit board having conductive strips to which the terminals are electrically connected.

5. The seismic detector assembly of claim 4 in which the conductor wires of the leader cable are connected electrically to a plurality of seismic detectors and in which the printed circuit board includes means for indicating the proper orientation of the printed circuit board relative to the other seismic detectors.

6. The seismic detector assembly of claim 5 in which the orientation indicating means includes a mark that indicates the proper position of the printed circuit board relative to the other seismic detectors connected to the leader cable.

7. The seismic detector assembly of claim 6 in which the mark is alphameric.

8. The seismic detector assembly of claim 4 in which the terminals are connected to the conductive strips by pigtails.

9. The seismic detector assembly of claim 8 in which the conductive strip to which each terminal is to be connected is provided with a hole to facilitate soldering the pigtail to the conductive strip and means for indicating which conductive strip is to be connected to which terminal.

10. The seismic detector assembly of claim 9 in which a damping resistor is connected between the conductive strips connected to the terminals and holes are provided in the strips to indicate which strips are to be so connected and to facilitate soldering the connections.

11. A seismic detector assembly comprising a housing, leader cables having conductor wires extending into the housing, a seismic detector located in the housing, said detector having a pair of external terminals that are positioned asymmetrical to the longitudinal axis of the detector and a printed circuit board having conductive strips for electrically connecting the terminals to the conductors of leader cables, said printed circuit board having a pair of asymmetrical openings through which the terminals can extend only when the printed circuit board is in one position relative to the seismic detector to locate the desired conductive strip adjacent each terminal.

12. The detector assembly of claim 11 in which the terminals are connected to the conductive strips by pigtails.

13. The detector assembly of claim 12 in which the conductive strip to which each terminal is to be connected is provided with a hole to facilitate soldering the pigtail to the conductive strip and means for indicating which conductive strip is to be connected to each terminal.

14. The detector assembly of claim 13 in which a damping resistor is connected between the conductive strips connected to the terminals and holes are provided in the strips to indicate which strips are to be connected and to facilitate soldering the connections.

15. The seismic detector assembly of claim 11 in which the conductor wires of the leader cable are connected electrically to a plurality of seismic detectors and in which the printed circuit board includes means for indicating the proper orientation of the printed circuit board relative to the other seismic detectors.

16. The seismic detector assembly of claim 15 in which the orientation indicating means includes a mark that indicates the proper position of the printed circuit board relative to the other seismic detectors connected to the leader cable.

17. The seismic detector assembly of claim 16 in which the mark is alphameric.

18. A seismic detector assembly comprising a seismic detector housing, a seismic detector in the housing, said detector having a pair of external terminals that are positioned asymmetrically relative to the longitudinal axis of the detector, a leader cable extending into the housing having conductor wires for connecting electrically to the terminals and means carried by the housing for holding the terminals in a preselected orientation relative to the longitudinal axis of the leader cables.

19. A seismic detector assembly comprising a housing, a seismic detector in the housing, said detector having a pair of external terminals that are positioned asymmetrically to the longitudinal axis of the detector, a pair of leader cables extending into the housing having conductor wires for connecting electrically to the terminals, and means for orienting the terminals in only one preselected position relative to the leader cables.

20. A seismic detector for mounting in a housing having leader cables extending into the housing with conductor wires for connecting electrically to the seismic detector, said detector comprising an outer case enclosing the detector and a positive terminal and a negative terminal extending outwardly from the case, said terminals being positioned asymmetrically to the longitudinal axis of the case so the identity of each terminal can be determined by their positions relative to each other and to the case.

* * * * *